United States Patent
Pettersson

(10) Patent No.: US 9,934,335 B2
(45) Date of Patent: Apr. 3, 2018

(54) METHOD AND SYSTEM FOR VIRTUAL ASSEMBLY OF A STRUCTURE

(71) Applicant: HEXAGON TECHNOLOGY CENTER GMBH, Heerbrugg (CH)

(72) Inventor: Bo Pettersson, London (GB)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 464 days.

(21) Appl. No.: 14/432,515

(22) PCT Filed: Oct. 7, 2013

(86) PCT No.: PCT/EP2013/070787
§ 371 (c)(1),
(2) Date: Mar. 31, 2015

(87) PCT Pub. No.: WO2014/056825
PCT Pub. Date: Apr. 17, 2014

(65) Prior Publication Data
US 2015/0254376 A1    Sep. 10, 2015

(30) Foreign Application Priority Data

Oct. 8, 2012 (EP) .................................... 12187568

(51) Int. Cl.
*G06F 17/50* (2006.01)
*G06Q 10/06* (2012.01)
*G06Q 50/08* (2012.01)

(52) U.S. Cl.
CPC ......... *G06F 17/5004* (2013.01); *G06Q 10/06* (2013.01); *G06F 2217/02* (2013.01); *G06F 2217/04* (2013.01); *G06Q 50/08* (2013.01)

(58) Field of Classification Search
CPC ............. G06F 17/5004; G06F 2217/02; G06F 2217/04; G06Q 10/06; G06Q 50/08
See application file for complete search history.

(56) References Cited

U.S. PATENT DOCUMENTS 6,272,447 B1 *   8/2001   Gavin ................. G06F 17/5004
                                                                700/118
7,146,295 B2 *  12/2006   Goodman ................. E03F 5/02
                                                                703/1

(Continued)

FOREIGN PATENT DOCUMENTS

CN          1881222 A      12/2006
DE  10 2008 062 458 A1      7/2009

(Continued)

OTHER PUBLICATIONS

Jian-hua et al., "Virtual assembly technology based on precision and physical attribute", Computer Integrated Manufacturing Systems, vol. 17, No. 3, Mar. 2011, pp. 595-604 (English Translation).

(Continued)

*Primary Examiner* — Ronald D Hartman, Jr.
(74) *Attorney, Agent, or Firm* — Maschoff Brennan

(57) ABSTRACT

The present invention relates to a method for virtual assembly of a structure, the structure being supposed to be assembled from a multitude of components on a construction site, the method comprising measuring, at a multitude of locations remote from the construction site, the components of the structure subsequent to their production and prior to their transport to the construction site, wherein the measuring comprises measuring at least the shape and size of connecting elements of each of the components, creating virtual representations of the components, virtually assembling the representations of the components, determining, based on assembly tolerances, whether the structure can be assembled with the measured components, and deciding, by means of an optimization algorithm, whether one or more components are to be reproduced, one or more components are to be reworked, and/or the structure is to be redesigned.

14 Claims, 5 Drawing Sheets

(56) References Cited

U.S. PATENT DOCUMENTS

| | | | |
|---|---|---|---|
| 7,433,510 B2 | 10/2008 | Saito et al. | |
| 7,966,159 B2* | 6/2011 | Lambert | G06F 17/5004 703/1 |
| 8,160,841 B2* | 4/2012 | Herman | G06F 17/5004 345/419 |
| 8,204,619 B2* | 6/2012 | Heil | G06F 17/5004 700/116 |
| 2003/0033311 A1* | 2/2003 | Skinner | G06Q 10/04 |
| 2004/0073410 A1* | 4/2004 | Maly | G06F 17/5004 703/1 |
| 2007/0203912 A1* | 8/2007 | Thuve | G06F 17/30958 |
| 2008/0077364 A1* | 3/2008 | Wakelam | G06F 17/5004 703/1 |
| 2008/0262800 A1* | 10/2008 | Lambert | G06F 17/5004 703/1 |
| 2008/0294395 A1* | 11/2008 | Lu | G05B 19/41885 703/2 |
| 2009/0024628 A1* | 1/2009 | Angel | G03B 37/00 |
| 2011/0054652 A1* | 3/2011 | Heil | G05B 19/4097 700/98 |
| 2013/0179206 A1* | 7/2013 | Harper | G06F 17/5004 705/7.13 |
| 2013/0211790 A1* | 8/2013 | Loveland | G06K 9/00637 703/1 |
| 2013/0211791 A1* | 8/2013 | Tsai | G06T 17/10 703/1 |
| 2013/0246108 A1* | 9/2013 | Nagy | G06Q 10/10 705/7.12 |
| 2014/0095119 A1* | 4/2014 | Lee | G06O 50/08 703/1 |
| 2014/0095122 A1* | 4/2014 | Appleman | G06T 19/003 703/1 |
| 2014/0207410 A1* | 7/2014 | Fuchs | G01B 21/04 702/155 |
| 2015/0134545 A1* | 5/2015 | Mann | G06F 17/5004 705/305 |

FOREIGN PATENT DOCUMENTS

| | | |
|---|---|---|
| DE | 10 2009 037830 B3 | 11/2010 |
| EP | 1653191 A1 | 5/2006 |

OTHER PUBLICATIONS

Guihua and Wenlong, "Ship Digital Modeling and Assembly Simulation", Guide of Sci-tech Magazine, Aug. 25, 2010.
Lianfeng, "Virtual Assembly Technology for Goliath," Ship Engineering, Jul. 15, 2012.
Ruxin, et al.,"Virtual Assembly Technology and Application", Defense Manufacturing Technology, Apr. 30, 2009.
Partial European Search Report dated Mar. 8, 2013 as received in Application No. 12 18 7568.
Gunther, W., "Die Revolution des Bauens", Faszination Forschung 04/09, May 1, 2009, pp. 72-82.
Woksepp et al., "Credibility and applicability of virtual reality models in design and construction", Advanced Engineering Informatics, vol. 22, Issue 4, Oct. 2008, pp. 520-528.
Savioja et al., "Utilizing Virtual Environments in Construction Projects", ITcon vol. 8, May 2003, pp. 85-99.
Using Virtual Reality in a Large-Scale Industry Project, Aug. 2006 at http://www.itcon.org/2006/43/.
Viscon: Computer Visualisation Support for Constructability, Apr. 2005 at http://www.itcon.org/2005/07/.
Wooyoung Kim et al. , "Visualized Construction Process on Virtual Reality" Information Visualisation, Jul. 25-27, 2001. Proceedings. Fifth International Conference on.

* cited by examiner

METHOD AND SYSTEM FOR VIRTUAL ASSEMBLY OF A STRUCTURE

FIELD OF THE INVENTION

The present invention relates to a method and system for a virtual assembly of representations of measured components of a structure subsequent to the production of the components and before their shipping to the assembly site of the structure. The virtual assembly allows determining whether the structure can be assembled with the real components and—in case the structure cannot be assembled—deciding whether a certain component has to be reworked or reconstructed or whether the structure has to be redesigned in order to make the structure constructible.

The present invention also relates to a method for engineering, procurement and construction of a structure, particularly for organizing assembling parts for a large device or a building at an assembly or construction location. The method comprises the steps of designing the structure and generating computer-aided design (CAD) data and specifications for the parts to be assembled, virtually assembling the structure from the parts based on the CAD data and generating a virtual assembly, acquiring standard parts and initializing manufacturing of special parts using logistic means, and shipping the parts, including the standard parts and the special parts, to the assembly or construction location. The invention also relates to a system for performing the method for engineering, procurement and construction of a structure.

BACKGROUND

The typical, traditional way for the engineering, procurement and construction of a structure, such as a building, a plant, a bridge or a machine or vehicle is as follows. At the beginning, there is a demand, for example of a customer, and the process for realization starts with the design of the structure. In case that a support structure for the building or plant is required, the design step includes also the design of the support structure, for example supported by a digital terrain model as a further input.

When the design of the whole structure is finished, thus allowing for an overview, the various parts for the structure are designed, and typically, related CAD data and specifications for the parts are generated. Then, nowadays a virtual assembly of the structure, eventually including a support structure, is created using a "virtual assembly" module of computerized design and construction tools. A list of needed parts is established and, depending on availability, it is determined which parts can be purchased as standard parts and which parts, as "special parts", have to be specially manufactured, eventually by a subcontractor, to whom then construction drawings are sent. The step of organizing the acquiring of the needed parts, including the mailing of purchase orders and requiring specification of delivery times, is typically performed using logistic means, which may also be integrated in the design tools.

After receipt of the parts, these are sent to the construction location where the assembly will be done. This means that specially manufactured parts will be shipped by the subcontractor directly to the assembly location, and the standard parts will be delivered from the supplier's stock to the assembly location.

The assembly will start in the order that is described by the assembly list (created from the "virtual assembly" module), assuming that all parts will fit together. If there are deviations in fitting, dimensions of tools etc., these issues are addressed by rework at the construction site, which typically involves significant difficulties, as typically in the construction environment an optimum infrastructure or equipment with manufacturing tools for the parts is often not given. In the worst case, parts have to be disassembled and sent back to the supplier for rework or exchange. These repair-type works are typically costly and can lead to significant delays and a replication of work steps, which is not at all efficient. A simple example of a problem that might arise at the construction site may be meeting two pipes that should be welded together but do not meet, such that they may have to be forced together and then welded, what would mean introducing stress into the system, thus impairing stability and potential life time of the structure.

In the case of a building or plant to be erected on a support structure, after design of the support structure first there will be a stake out of support positions for the support structure, before the support structure is built from the acquired related parts. Even if the parts or already pre-manufactured sub-assemblies for the building/plant arrive in a correct state as planned at the construction site, problems may arise if the support positions/orientations are not correct. This could, for example, cause a need for adjusting/changing the support positions or the support structure, which typically is very costly at this stage of the process.

For supporting construction processes and organizing an assembling of parts to form structures thereof, different approaches are known. For example the patents DE 10 2008 062 458 A1 and DE 10 2009 037 830 B3 each disclose devices for the measuring of large assembly parts.

DE 10 2008 062 458 A1 discloses a laser-based measuring device for use during manufacturing processes in machine and equipment construction. The device has a laser utilized as a light source and an optical sensor, e.g. a charge coupled device (CCD) matrix sensor, where an object to be measured is provided in the laser radiation beam path of the laser. A first polarizing filter is provided in the radiation beam path, where adjustment of a polarization plane corresponds to a direction of linear polarization of the laser radiation. A second polarizing filter is arranged in the radiation beam path such that the orientation of its polarization plane is twisted with respect to the polarization plane of the first polarizing filter. Additionally, a color filter is placed in the radiation beam path in order to allow only pass of radiation of the laser emission wavelength.

DE 10 2009 037 830 B3 discloses a device and a method for measuring the surface of assembly parts, particularly of large components, using a scanning system on a measuring arm. The scanning can be done either mechanically in a tactile manner or optically using a laser. The device can be positioned and fixed on the assembly part. Then the arm, which has a fixed reference point with respect to the assembly part, is driven by a drive unit and an area of the surface of the assembly part is measured. This step is repeated until the assembly part has been measured completely.

EP 1653191 A1 discloses an apparatus for presenting differences between objects, such as an actual position and posture of an input target object, in real space and their corresponding design information in virtual space, for example as stored figuration information of the target object. The apparatus includes a superposed image generation unit, configured to generate an image which is obtained by superposing and displaying the image of the target object input from the image input unit and the stored figuration information of the target object. The apparatus includes a three-dimensional CAD with a three-dimensional design information storage unit configured to store three-dimensional design information of the target object. The apparatus is dedicated for facilitating the adaptation of the actual real target object to its design, particularly related to the construction process of a plant or factory facility.

Several studies have been published which address the introduction of virtual reality (VR) in architecture and in the construction process.

The use of 4D/VR in the construction of a high-rise apartment and commercial store building project in South Korea is described in Kim et al (2001). The biggest gain from using 4D/VR models was achieved from improving communication between managers and workers which led to reducing the construction time from 43 months to 39 months (Kim W., Lim H. C, Kim O., Choi Y. K. and Lee I.-S. (2001), "Visualized construction process on virtual reality", Proceedings of the Fifth International Conference on Information Visualisation, IEEE Computer Society, Los Alamitos, Calif., USA, pp 684-689).

The use of VR in the construction of a new lecture hall in Helsinki was studied by Savioja et al (2003). The study described the process starting from a relative simple VR model for presentation of the concept and layout. The model was further detailed until a photo realistic model of the building could be presented and used for detailed studies of the design (Savioja L., Mantere M, Iikka O., Ayräväinen S., Gröhn M. and Iso-Aho J. (2003), "Utilizing virtual environments in construction projects", Electronic Journal of Information Technology in Construction (ITcon) Vol. 8, pp 85-99).

Woksepp et al. (2004) investigated how a VR model was experienced and assessed by the users in the construction of a large hotel and office building, and the extent to which such model could complement the 2D CAD drawings that are mainly employed in such a context (Woksepp S., Tullberg O. and Olofsson T. (2004), "Virtual reality at the building site: investigation how the VR model is experienced and its practical applicability", Proceedings of European Conference on Product and Process Modeling in Construction (ECPPM 2004), Istanbul, Turkey, 8-10 September).

Ganah et al (2005) presented a research project with the aim to develop a visualisations system for graphical communication of constructability information between design and construction teams. The objective was to improve the lack of communication between design and construction using visualisation tools (Ganah A. A., Bouchlaghem N. B. and Anumba C J. (2005), "VISCON: Computer visualisation support for constructability, Electronic Journal of Information Technology in Construction (ITcon), Vol. 10, pp 69-83).

Recently, also efforts have been undertaken in order to introduce VR in the construction process as a tool to support the design and construction process, besides only use as a visualization tool. A case study was published which described the use of VR in a construction project by providing values achieved and examples from how the customer, design teams and planning teams have been using VR models as a complementary source of information to 3D CAD models and 2D CAD drawings in the construction of a large-scale pelletizing plant (MK3) in northern Sweden. The research objective was to provide new insights and knowledge about the values of using VR models in a construction projects with focus on the design and planning process (Woksepp S., Olofsson T., "Using virtual reality in a large-scale industry project, ITcon Vol. 11 (2006), pp 627-640). Within this construction project, an iterative design process concerning, besides others, mechanics, electrical installations and the control system and involving the development of digital mock-up models, which were subjected to modifications for eliminating design errors in the course of the project, was developed.

The above described approaches, however, are all related only to parts of the process for engineering, procurement and construction of a structure, but do not present a solution for the process as a whole.

SUMMARY

Some embodiments of the invention provide a method and a system for virtual assembly of a structure.

Some embodiments of the invention provide an improved method for engineering, procurement and construction of a structure, such as a building or plant, on a support structure adequate for avoiding such repair or correction needs in a late stage of the construction process.

Some embodiments of the invention provide a system for performing such method.

According to a first aspect of the invention, a method for virtual assembly of a structure comprises measuring, at a multitude of locations remote from the construction site of the structure, a multitude of components of the structure subsequent to the components' production and prior to their transport to the construction site. The structure in particular is an individual manufacture. The method further comprises creating, based on the measuring, virtual representations of the measured components, virtually assembling the representations of the components and determining whether the structure can be assembled with the measured components and in accordance with predefined assembly tolerances of the structure and the components. The method also comprises analyzing and outputting possible adjustment solutions from a given set of adjustments solutions. This set comprises at least one of the following solutions:

one or more of the measured components must be exchanged, one or more of the measured components must be reworked—either by the manufacturer or at the construction site, the structure must be redesigned.

In a preferred embodiment, the set comprises all of these solutions.

In a preferred embodiment, the structure is a building, a plant, such as a power plant, a bridge, such as a large suspension bridge, a support structure, for instance for a building, plant or bridge. The structure can also be a large mobile object, such as a ship, airship, or large machinery, such as a tunnel boring machine or surface mining machinery.

In one embodiment the virtual assembly of the representations of the components is done with the help of existing CAD data of the structure.

In one embodiment the method comprises measuring the construction site and generating a digital terrain model. The virtual assembly of the representations of the components is preferably done with the help of a digital terrain model of the construction site.

In a preferred embodiment analyzing and outputting possible adjustment solution is subject to a negative result in determining whether the structure can be assembled with the measured components and in accordance with predefined assembly tolerances of the structure and the components.

Optionally, the analyzing of possible adjustment solutions can be done with the help of an optimization algorithm that takes into account a time schedule of the construction, the delay and costs that would be caused by a redesign of the structure and the delay and costs that would be caused by exchanging, reproducing or reworking a specific component.

In another embodiment of the first aspect of the invention, the method also comprises the acquiring of the standard components and the initializing of the manufacture of the special components of the structure.

In another embodiment the method also comprises performing actions according to at least one of the adjustment solutions, in particular if in accordance with the predefined assembly tolerances the structure cannot be assembled with the measured components.

In another embodiment the method also comprises transporting the components to the construction site, assembling the components at the construction site and/or controlling machine-assisted assembly of the components at the construction site, in particular if in accordance with the predefined assembly tolerances the structure can be assembled with the measured components.

In one embodiment only special components are measured, as standard components usually can be exchanged without much delay even on the construction site. In another embodiment the method comprises measuring of all components. This can be especially useful if also the supply of standard parts is complicated, time-consuming and/or expensive at the construction site.

The first aspect of the invention also comprises a system for virtual assembly of a structure. The system comprises a plurality of measuring stations located at production sites for different components of the structure. Each measuring station is adapted for generating measurement data of at least one component of the structure and, for this purpose, has at least one measuring means for measuring at least one component subsequent to its production and prior to its transport to the construction site. The measuring comprises determining at least the shape and size of interface parts of the components. The system also comprises computing means adapted for receiving the measurement data from the measuring stations,
virtually assembling the components based on the measurement data,
determining, based on the virtual assembly and on assembly tolerances, whether predefined assembly tolerances would be violated if the structure would be assembled with the measured components, and
analyzing and outputting possible adjustment solutions from a set of adjustment solutions.

The set of adjustment solutions comprises at least one of the following:
one or more components are to be exchanged,
one or more components are to be reworked,
the structure is to be redesigned.

In a preferred embodiment the system comprises construction site measuring means for measuring the construction site and producing measuring data as a basis for a digital terrain model of the construction site, in particular wherein the computing means are adapted for taking the digital terrain model into account for the virtual assembly.

In one embodiment the system comprises logistics means for acquiring standard components and/or initializing manufacturing of special components and shipping the standard and/or special components to the construction site.

In another embodiment the system comprises manufacturing means for assembling the components at the construction site.

In a further embodiment the system comprises machine control means for controlling machine-assisted assembly of components at the construction site.

In a preferred embodiment of the system the measuring means comprise coordinate measuring machines (CMM), laser scanners, range cameras, laser trackers and/or tachymeters.

Another aspect of the invention is a system for engineering, procurement and construction of a structure, particularly for organizing assembling parts for a large device or a building at an assembly or construction location. The system comprises measuring means, computing and calculating means for execution of computer programmes, logistic means which are configured for acquiring standard parts, initializing manufacturing of special parts and shipping the parts, including the standard parts and the special parts, to the assembly or construction location, and manufacturing means which are configured for assembling the parts. The computing and calculating means are configured for designing the structure and generating computer-aided design (CAD) data and specifications for the parts to be assembled, and for virtually assembling the structure from the parts based on the CAD data and generating a virtual assembly.

According to this aspect of the invention, the measuring means are configured for measuring the parts or at least interface sections of the acquired parts, including standard parts and special parts, and generating measured data of the parts to be assembled. The computing and calculating means are additionally configured for positioning the parts based on the measured data, comparing virtual assemblies with one another and determining from this comparison and a comparison of the measured and CAD part data if any parts do not conform to the generated CAD data and specifications.

The system according to the invention can be situated as a whole at a central location, but different parts of the system, like for example the measuring means or the manufacturing means, can also be located at different sites, for example at the assembly or construction location.

By means of this system according to the invention, a solution for organizing a complex process of engineering, procurement and construction of a structure as a whole in an efficient way is provided.

According to one embodiment, the structure is a plant or a support structure for a plant. Then, preferably, the measuring means are additionally configured for measuring the support structure and generating measured data of the support structure.

For this case, it is further preferred that the computing and calculating means are additionally configured for
designing the support structure and the plant, including parts to be assembled, and generating computer-aided design (CAD) data and specifications for the support structure, the plant and the parts to be assembled, optionally with support by a digital terrain model of the construction location dedicated for building the plant;
virtually assembling the support structure and the plant from the parts based on the CAD data and generating a virtual assembly of the support structure and the plant;
comparing a virtual assembly of the support structure based on the measured data with a virtual assembly of the support structure based on the CAD data of the support structure and determining from this comparison if the virtual assembly based on measured data does conform with the virtual assembly based on CAD data and with the specifications for the support structure; and virtually assembling the plant on the support structure based on the virtual assembly of the plant and based on the virtual assembly of the support structure, thus generating a second virtual assembly of the plant, and determining if the second virtual assembly of the plant does fit the virtual assembly of the support structure.

With this embodiment of the invention, a system capable for organizing the whole process for engineering, procurement and construction of a plant on a support structure is provided.

For the embodiment of the structure being a plant or a support structure it is preferred that the logistic means are additionally configured for acquiring standard parts and initializing manufacturing of special parts for the support structure and the plant.

It is also preferred that the manufacturing means are additionally configured for assembling the parts of the support structure and building the support structure.

Additionally, it is preferred that the manufacturing means are additionally configured for assembling the parts of the plant and building the plant on the support structure.

According to a further embodiment, the system is additionally provided with construction support means for staking out support positions for the support structure based on a digital terrain model of the construction location dedicated for building the plant and on the CAD data for the support structure.

According to a further embodiment, the system additionally comprises machine control means configured for controlling the building of the support structure.

A further subject of the invention is a method for engineering, procurement and construction of a structure, particularly for organizing assembling parts for a large device or a building at an assembly or construction location, comprising the steps of:
  i) designing the structure and generating computer-aided design (CAD) data and specifications for the parts to be assembled;
  ii) virtually assembling the structure from the parts based on the CAD data by means of a computer programme and generating a first virtual assembly;
  iii) using logistic means, acquiring standard parts and initializing manufacturing of special parts;
  iv) shipping the parts, including the standard parts and the special parts, to the assembly or construction location; and
  v) assembling the parts.

According to the invention, the method comprises the additional steps of
  a) measuring the parts or at least interface sections of the acquired parts, including standard parts and special parts, and generating measured data of the parts to be assembled, before the step iv) of shipping the parts to the assembly location;
  b.1) virtually assembling the structure from the parts based on the measured data of the parts and generating a second virtual assembly, or
  b.2) positioning the parts based on the measured data;
  c) comparing the second virtual assembly or the positioned parts of step b.2) with the first virtual assembly and determining from this comparison and a comparison of measured and CAD part data if any parts do not conform with the generated CAD data and specifications;
  d) continuing with step iv) if the parts do conform with the generated CAD data and specification and initializing a correction or an exchange of parts which do not conform with the generated CAD data and specifications;
  e) measuring the corrected or exchanged parts or at least interface sections of them, and generating measured data of the corrected or exchanged parts;
  f.1) virtually assembling the structure from the parts based on the measured data of the parts, including the corrected or exchanged parts, and generating a third virtual assembly; or f.2) positioning the parts based on the measured data;
  g) comparing the third virtual assembly with the first virtual assembly or the positioned parts of step f.2) and determining from this comparison and a comparison of measured and CAD part data if any parts do not conform with the generated CAD data and specifications;
  h) continuing with step iv) if the parts do conform with the generated CAD data and specification, and initializing a correction or an exchange of parts which do not conform with the generated CAD data and specifications and then continuing with step e).

A further embodiment is a method for engineering, procurement and construction of a plant on a support structure, comprising the steps of:
  i) designing the support structure and the plant, including parts to be assembled, and generating computer-aided design (CAD) data and specifications for the support structure, the plant and the parts to be assembled;
  ii) staking out support positions for the support structure;
  iii) virtually assembling the support structure and the plant from the parts based on the CAD data by means of a computer programme and generating a first virtual assembly of the support structure and the plant;
  iv) using logistic means, acquiring standard parts and initializing manufacturing of special parts for the support structure and the plant;
  v) shipping the parts of the construction structure, including the standard parts and the special parts, to the construction location;
  vi) assembling the parts of the support structure and building the support structure;
  vii) shipping the parts of the plant, including the standard parts and the special parts, to the construction location; and
  viii) assembling the parts of the plant and building the plant on the support structure.

According to the invention, the method comprises the additional steps of
  a) measuring the support structure and generating measured data and a second virtual assembly of the support structure based on the measured data of the support structure, before the step vii) of shipping the parts of the plant to the construction location;
  b) comparing the second virtual assembly of the support structure based on the measured data with the first virtual assembly based on the CAD data of the support structure and determining from this comparison if the second virtual assembly does conform with the first virtual assembly and the specifications for the support structure;
  c) measuring the parts or at least interface sections of the parts for the plant and generating measured plant data, before the step vii) of shipping the parts of the plant to the construction location;
  d) virtually assembling the plant on the support structure based on the measured plant data and based on the second virtual assembly of the support structure, thus generating a second virtual assembly of the plant, and determining if the second virtual assembly of the plant does fit the second virtual assembly of the support structure;

e) if at least one of e.1) the second virtual assembly of the support structure does not conform with the first virtual assembly and the specifications for the support structure, and e.2) the second virtual assembly of the plant does not fit the second virtual assembly of the support structure, then f) performing at least one of g.1) modifying or re-building the support structure so that the modified or re-built support structure fits the first virtual assembly of the plant, followed by steps h.1), i.1), j.1), k.1), and g.2) re-designing the plant and/or correcting or re-manufacturing parts for the plant which do not conform with the CAD data or the specifications and generating a third virtual assembly of the plant so that the third virtual assembly of the plant fits the second virtual assembly of the support structure, followed by steps h.2), i.2), j.2), otherwise continuing with step vii);

h.1) measuring the modified or re-built support structure and generating measured data and a third virtual assembly of the support structure based on the measured data of the modified or re-built support structure;

i.1) comparing the third virtual assembly of the modified or re-built support structure based on the measured data with the first virtual assembly based on the CAD data of the support structure and determining from this comparison if the third virtual assembly does conform with the first virtual assembly and the specifications for the support structure;

j.1) virtually assembling the plant on the support structure based on the first virtual assembly of the plant, based on CAD data, and based on the third virtual assembly of the support structure, thus generating a fourth virtual assembly of the plant, and determining if the fourth virtual assembly of the plant does fit the third virtual assembly of the support structure;

k.1) continuing with step vii) if the fourth virtual assembly of the plant does fit the third virtual assembly of the support structure, and otherwise continuing with step e);

h.2) measuring and generating measured data for the re-designed plant and/or corrected or re-manufactured parts for the plant and generating a fifth virtual assembly of the plant based on the measured data and/or the re-designed plant;

i.2) virtually assembling the plant on the support structure based on the fifth virtual assembly of the plant, thus generating a sixth virtual assembly of the plant, and determining if the sixth virtual assembly of the plant does fit the second virtual assembly of the support structure;

j.2) continuing with step vii) if the sixth virtual assembly of the plant does fit the third virtual assembly of the support structure, and otherwise continuing with step e).

According to a variation of this third embodiment of the method, a digital terrain model of the construction location dedicated for building the plant is obtained before designing the support structure and the plant.

According to a further variation, staking out the support positions for the support structure is performed based on the digital terrain model and the CAD data for the support structure.

According to still another variation of this third embodiment of the method, in step vi) building of the support structure is performed under machine control.

A further subject of the invention is a computer programme product configured to be executed on a computer for performing a method according to the invention for engineering, procurement and construction.

BRIEF DESCRIPTION OF THE DRAWINGS

In the following, the invention will be described in detail by referring to exemplary embodiments that are accompanied by figures, in which.

DETAILED DESCRIPTION

Figure 1:
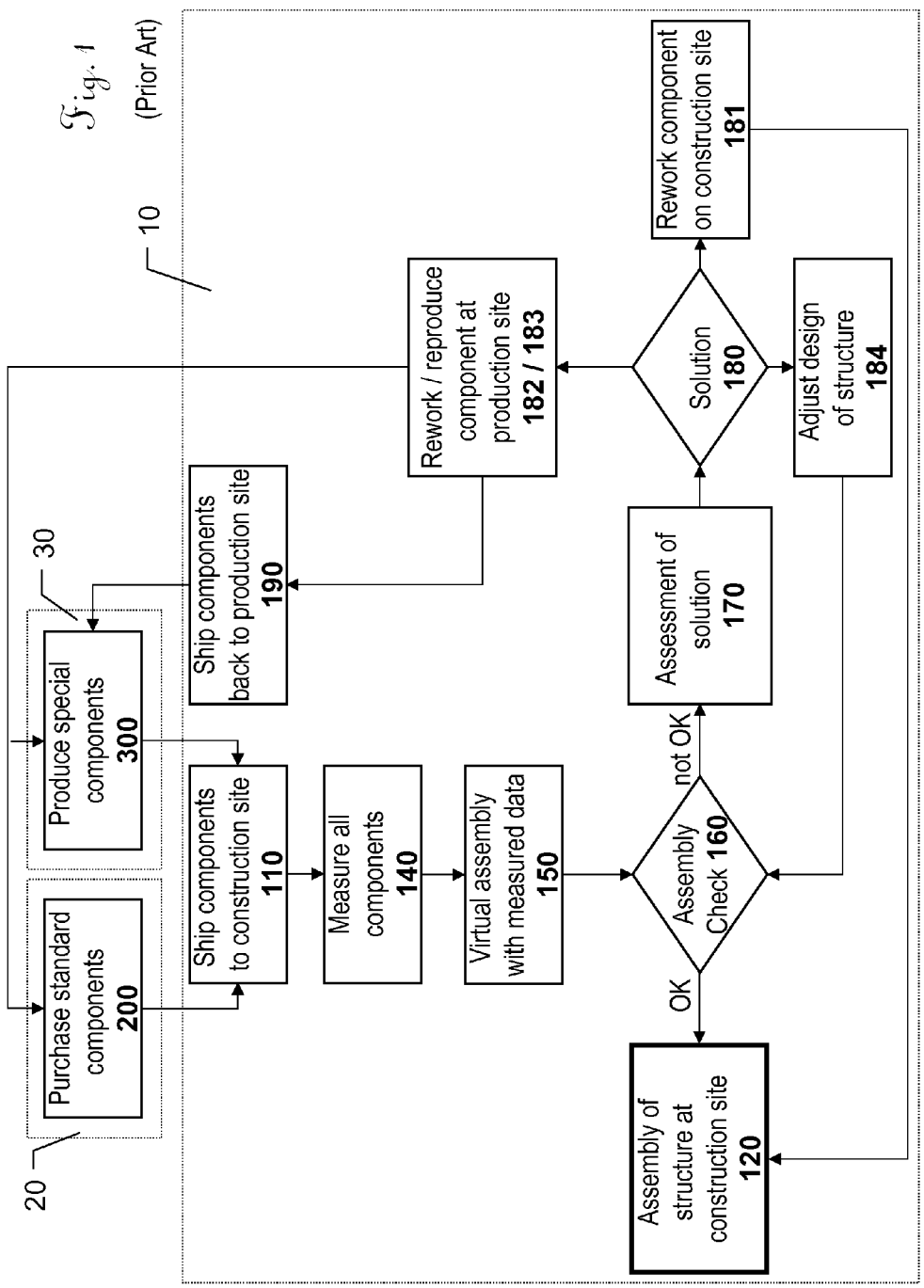
FIG. 1 illustrates the steps of a method as known from prior art for virtual assembly of a structure.

FIG. 1 is a flow chart illustrating the steps of a method known from prior art for virtual assembly of a structure before the real assembly. For the construction 120 of a structure at a construction site 10, from a first supplier 20 standard components have been purchased 200 and from a second supplier 30 special components have been produced 300. These components are then transported to the construction site 10, where before the beginning of the assembly all components are measured 140. With the measurement data representations of the components are virtually assembled 150. Based on given tolerance levels an assembly check is performed 160 with the virtual assembly. If this check is positive, the components are assembled 120 in order to build the structure. If the check is negative, which means that the structure cannot be built with the components as measured, a solution for the problem must be assessed 170. Often, it is possible to rework the faulty components on the construction site 181, or to adjust the design of the structure 184. But sometimes, the components need to be reproduced 183 from the supplier or even transported back 190 to the supplier for rework of the faulty component 182. This can be very time consuming and expensive when the whole construction comes to a stop.

Figure 2:
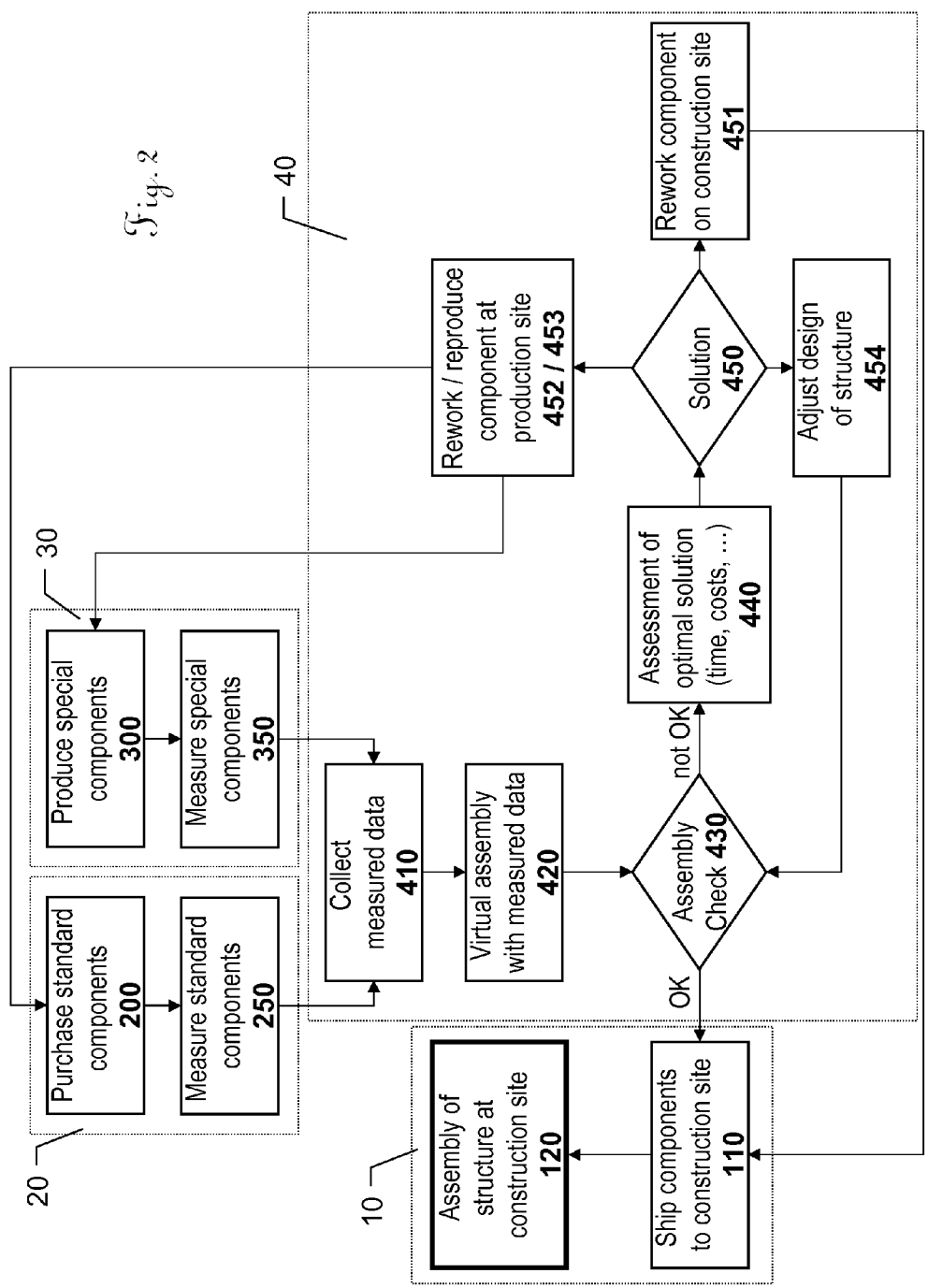
FIG. 2 illustrates the steps of a first embodiment of a method according to the invention for virtual assembly of a structure.

In FIG. 2 a flow chart illustrates the steps of a method according to the invention for virtual assembly of a structure before the real assembly. Again, for the construction 120 of a structure at a construction site 10, standard components have been purchased 200 from a first supplier 20 and special components have been produced 300 by a second supplier 30. These components are measured at the productions sites 250, 350. The data of these measurements are transmitted to a data procession centre 40, where the measured data is collected 410 and used for a virtual assembly 420 of representations of the components. Based on given tolerance levels an assembly check is performed 430 with the virtual assembly. If this check is positive, the components are transported to the construction site 110 and assembled 120 in order to build the structure. If the check is negative, which means that the structure cannot be built with the components as measured without violating the tolerance level of the structure and/or at least one component, the optimal solution for the problem is assessed 170, in particular by means of an optimization algorithm that is adapted to consider the time schedule, the delay and costs created by redesigning the structure, and the delay and costs created by reproducing or reworking a faulty component. Often, it is possible to rework the faulty components on the construction site 451, or to adjust the design of the structure 430. In the first case, the components can be transported 110 to the construction site 10; in the latter case, another assembly check is performed beforehand. Sometimes, it is necessary that the faulty components are reproduced 183 or reworked 182 by the supplier. As, according to the invention, the component is still at the production site, only little time is consumed in this case. In case of a faulty standard part, this might just be replaced with another, correct one. The reworked, reproduced or exchanged components are then also measured for another virtual assembly and assembly check.

Figure 3:
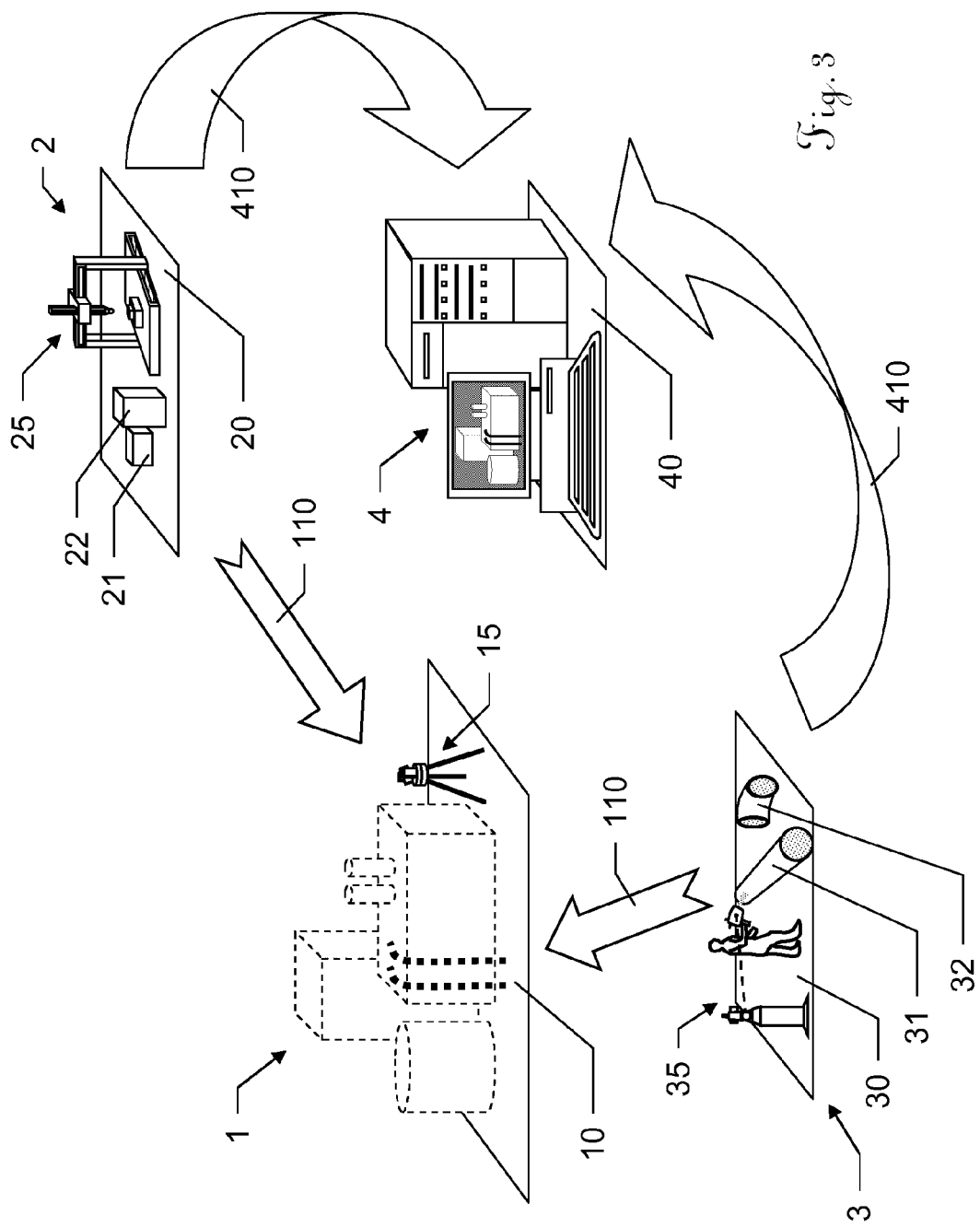
FIG. 3 illustrates the a first embodiment of a system for virtual assembly of a structure according to the invention.

FIG. 3 shows a system according to the invention for virtual assembly of a structure before the real assembly.

On a construction site 10, a structure 1 is to be constructed. Components 21, 22, 31, 32 from which the structure 1 is to be assembled are produced at a multitude of production sites 20, 30 (here, for overview reasons only two are shown). At each production site 20, 30 a measuring station 2, 3 is located having at least one measuring means 25, 35 for measuring the components 21, 22, 31, 32 produced at the respective production site 20, 30 and for capturing measurement data. The measurement data comprises data about the shape and size of the components 21, 22, 31, 32, particularly of their connecting elements. As examples for suitable measuring means, here a portal-type coordinate measuring machine 25 and a laser tracker system 35 with a hand held scanner are shown.

Optionally, at the construction site 10, a measuring station having measuring means 15 is provided for capturing measurement data about the terrain of the construction site. The measuring means 15 can be a geodetic measuring device or a laser scanner or a combination of both and are adapted to create a digital terrain model of the construction site 10.

At a data procession centre 40 computing means 4 are provided. These computing means 4 are adapted for receiving the measurement data 410 and, based thereon, for virtually assembling the construction 1 from virtual representations of the components 21, 22, 31, 32 and, optionally, based on the digital terrain model. The computing means 4 are also adapted for determining, based on the virtual assembly, whether predefined assembly tolerances would be violated if the structure 1 would be assembled with the measured components 21, 22, 31, 32, i.e. if the real construction 1 can be built with the measured components 21, 22, 31, 32 with respect to predefined assembly tolerances of the structure 1 and/or the components 21, 22, 31, 32.

The computing means 4 are adapted—provided that the predefined assembly tolerances would not be violated if the structure 1 would be assembled with the measured components 21, 22, 31, 32—to transmit the result to the measuring stations 2, 3. The components 21, 22, 31, 32 are then clear for transport 110 to the construction site 10.

The computing means 4 are adapted to assess—provided that the predefined assembly tolerances would be violated if the structure 1 would be assembled with the measured components 21, 22, 31, 32—a solution in order to enable the structure 1 to be built.

Figure 4:
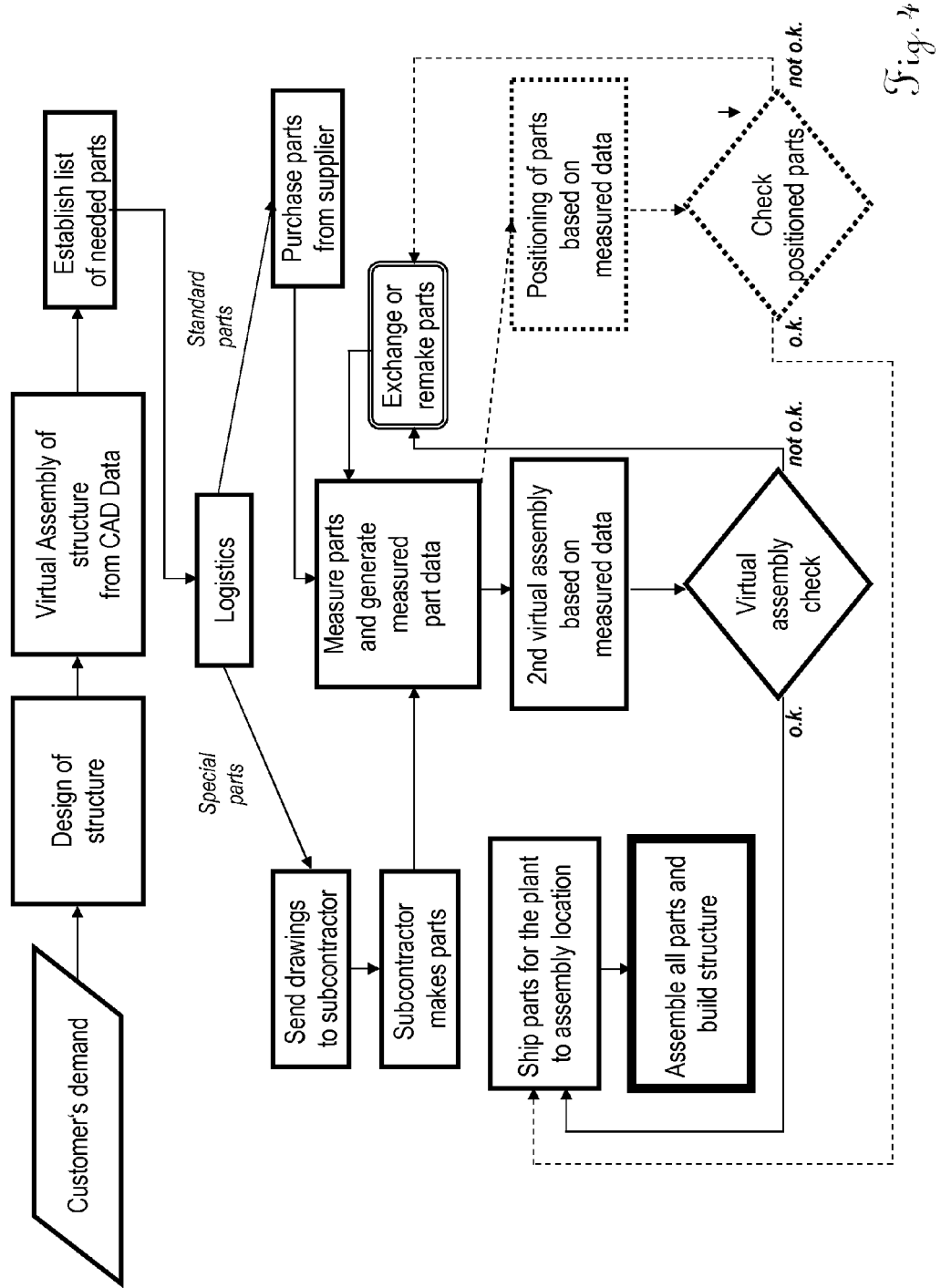
FIG. 4 illustrates the different steps of a second embodiment of a method according to the invention for engineering, procurement and construction of a structure.

FIG. 4 illustrates the different steps of a second embodiment of a method according to the invention for engineering, procurement and construction of a structure.

At the beginning, there is a demand, for example of a customer, and the process for realization starts with the design of the structure.

When the design of the whole structure is finished, thus allowing for an overview, the various parts for the structure are designed, and related CAD data and specifications for the parts are generated. Then, a virtual assembly of the structure is created. A list of needed parts is established and, depending on availability, it is determined which parts can be purchased as standard parts and which parts, as "special parts", have to be specially manufactured, eventually by a subcontractor, to whom then construction drawings are sent. The step of organizing the acquiring of the needed parts, including the mailing of purchase orders and requiring specification of delivery times, is performed using logistic means, which may be integrated in the design tools.

After receipt of acquired standard parts and specially manufactured parts, all parts, including standard parts and special parts, or at least their interface sections are measured and measured data of the parts to be assembled are generated. This is followed by virtually assembling the structure from the parts based on the measured data of the parts and generating a second virtual assembly, or by positioning the parts based on the measured data.—This alternative step and the further step following this alternative approach are indicated in FIG. 4 by dotted lines.

The generation of the second virtual assembly using real data can take place at different locations, for example at a central location for engineering, procurement and construction, at the subcontractor, or at the assembly or construction site for the structure.

Then, in order to check the second virtual assembly or the positioning of the parts, the outcome of these alternative steps is compared with the first virtual assembly. From this comparison and a comparison of measured and CAD part data it is determined if any parts do not conform to the generated CAD data and specifications.

If the parts do conform to the generated CAD data and specifications, the parts are shipped to the assembly and construction location, what is then followed by assembling all parts and building the structure. The assembly at the construction or assembly location will start in the order that is described by the assembly list.

Otherwise, a correction or an exchange of parts which do not conform to the generated CAD data and specifications is initialized. Although not indicated in FIG. 4, this step may include a modification of the design in order to enable a mutual fitting of the parts, which would only then be followed by a correction of parts if necessary.

Then, in principle in a kind of loop of the workflow, the corrected or exchanged parts or at least interface sections of them are measured, and measured data of the corrected or exchanged parts are generated. This is again followed by virtually assembling the structure from the parts based on the measured data of the parts, including the corrected or exchanged parts, and generating a third virtual assembly; or by positioning the parts based on the measured data.

Then, the third virtual assembly is compared with the first virtual assembly, or the outcome of the positioning of the corrected or exchanged parts is compared with the first virtual assembly, and from this comparison and a comparison of measured and CAD part data it is determined if still any parts do not conform with the generated CAD data and specifications.

If the parts now do conform to the generated CAD data and specification, the parts are shipped to the assembly and construction location, what is then followed by assembling all parts and building the structure. Otherwise, a correction or an exchange of parts which do not conform to the generated CAD data and specifications is initialized again, and the above loop of the work flow is followed again.

Figure 5:
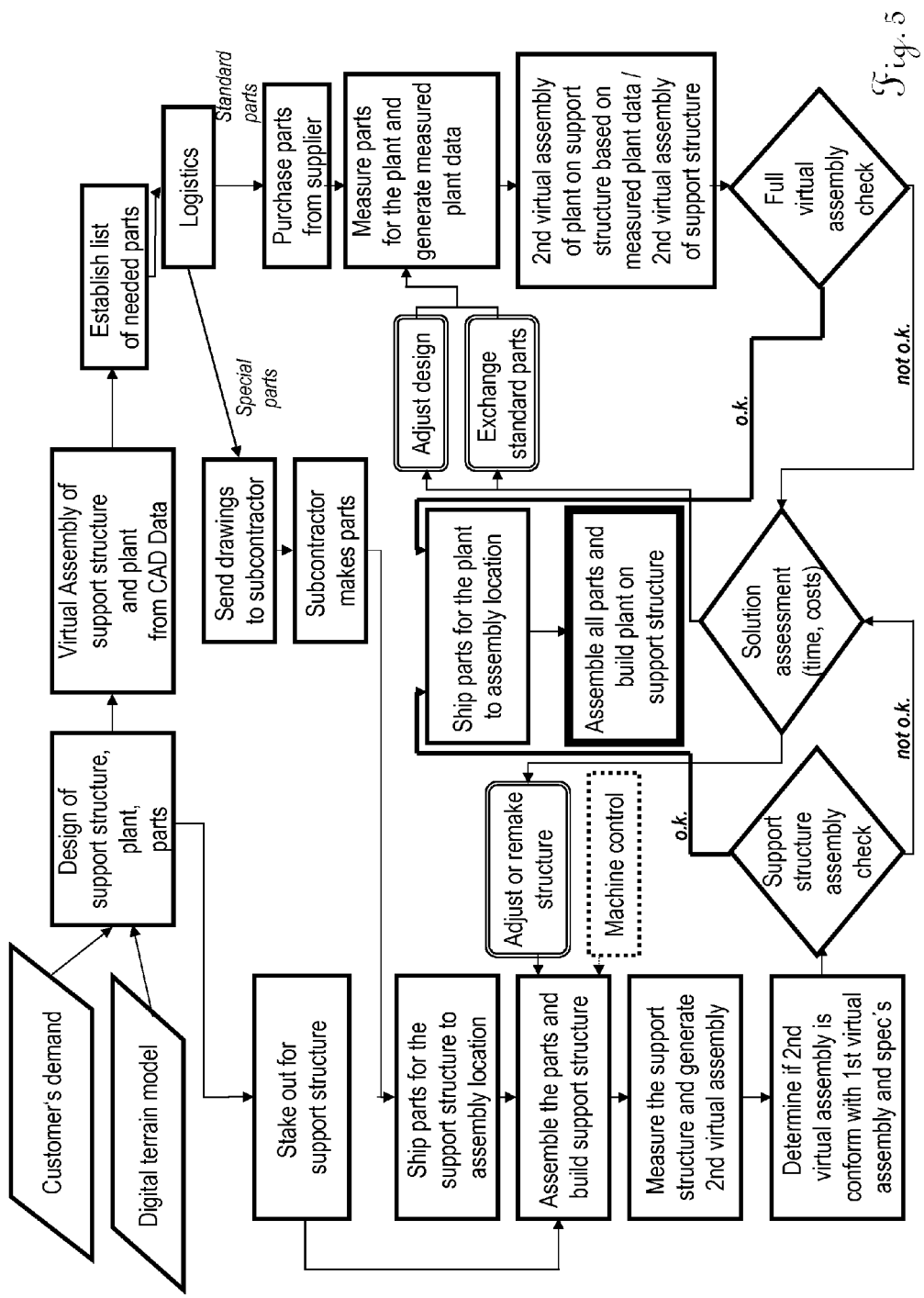
FIG. 5 illustrates the different steps of a third embodiment of a method according to the invention for engineering, procurement and construction of a plant on a support structure.

FIG. 5 illustrates the different steps of a third embodiment of a method according to the invention, for engineering, procurement and construction of a plant on a support structure. This illustration includes parts of the workflow of FIG. 4, supplemented however by the additional necessary steps related to the support structure.

At the beginning, there is again a demand, for example of a customer. Additionally, as a further input for the following process, a digital terrain model of the construction location dedicated for building the plant may be obtained. Then, the process starts with designing of the support structure and the plant, including all parts to be assembled, and generating computer-aided design (CAD) data and specifications for the support structure, the plant and the parts to be assembled.

After completion of the design, at the envisaged assembly or construction location staking out of support positions for the support structure is performed. According to one embodiment, this is performed under machine control or measurement machine control. This option is associated with the advantage that a measurement feedback is provided during the step of building the support structure and an incorrect realization of the support structure can better be avoided.

Typically at the location for engineering, procurement and construction, the support structure and the plant are virtually assembled from the parts based on CAD data, and a first virtual assembly of the support structure and the plant is generated. A list of needed parts is established and, depending on availability, it is determined which parts can be purchased as standard parts and which parts, as "special parts", have to be specially manufactured, eventually by a subcontractor, to whom then construction drawings are sent. The step of organizing the acquiring of the needed parts, including the mailing of purchase orders and requiring specification of delivery times, is performed using logistic means.

The parts for the support structure are typically shipped by the supplier or subcontractor directly to the assembly or construction location, where the support structure is assembled and built from the parts.

The support structure is then measured, and measured data and a second virtual assembly of the support structure based on the measured data of the support structure are generated. Optionally additionally, (not shown in FIG. 5) the parts for the support structure may be measured in advance of their assembling and an intermediate additional virtual assembly of the support structure based on these measured data may be generated, in advance of the real assembling of these parts, in order to detect and correct imperfections before building the support structure.

The second virtual assembly of the support structure based on the measured data is compared with the first virtual assembly based on the CAD data of the support structure.

From this comparison it is determined if the second virtual assembly does conform to the first virtual assembly and the specifications for the support structure, as a support structure assembly check.

Typically at the location for engineering, procurement and construction, the parts or at least interface sections of the acquired parts for the plant are measured and measured plant data are generated.

This is followed by virtually assembling the plant on the support structure based on the based on the measured plant data and the second virtual assembly of the support structure, thus generating a second virtual assembly of the plant, and determining if the second virtual assembly of the plant does fit the second virtual assembly of the support structure, as a full virtual assembly check.

Dependent on the outcome of the support structure assembly check and the full virtual assembly check, there are different possible further steps.

In the easiest case, if the second virtual assembly does conform with the first virtual assembly and the specifications for the support structure, and if the second virtual assembly of the plant does fit the second virtual assembly of the support structure, all parts for the plant are shipped to the assembly location, where the parts are assembled and the plant is built on the support structure.

If the second virtual assembly of the support structure does not conform with the first virtual assembly and the specifications for the support structure, and/or the second virtual assembly of the plant does not fit the second virtual assembly of the support structure, an assessment of the most efficient problem solution, particularly regarding time and costs, has to be performed.

Dependent on the result of this assessment, as one possibility, modifying or re-building the support structure may be performed, with the purpose that it then fits the first virtual assembly of the plant.

Then, in principle again in a kind of loop of the workflow, the modified or re-built support structure is measured, and measured data and a third virtual assembly of the support structure based on the measured data of the modified or rebuilt support structure are generated.

This is then followed by comparing the third virtual assembly of the modified or re-built support structure based on the measured data with the first virtual assembly based on the CAD data of the support structure and determining from this comparison if the third virtual assembly does conform to the first virtual assembly and the specifications for the support structure.

Then, a virtual assembling of the plant on the support structure based on the first virtual assembly of the plant, based on CAD data, and based on the third virtual assembly of the support structure, thus generating a fourth virtual assembly of the plant is performed, and it is determined if the fourth virtual assembly of the plant does fit the third virtual assembly of the modified or re-built support structure.

If the fourth virtual assembly of the plant does fit the third virtual assembly of the support structure, all parts for the plant are shipped to the assembly location, where the plant is then built on the support structure. Otherwise the step of problem solution assessment is performed again, and the above loop of the workflow is followed again.

As another possible problem solution may be undertaken a re-designing of the plant and/or correcting or re-manufacturing parts for the plant which do not conform with the CAD data or the specifications and generating a third virtual assembly of the plant, with the purpose that the third virtual assembly of the plant based on the modified design and/or the corrected or re-manufactured parts then fits the second virtual assembly of the support structure, which does in fact not correspond to its initial design.—This solution may be advantageous and more cost-effective particularly when the support structure is very expensive in comparison to the parts for the plant.

This is then followed by measuring and generating measured data for the re-designed plant and/or corrected or re-manufactured parts for the plant and generating a fifth virtual assembly of the plant based on the measured data and/or the re-designed plant.

Then again a virtual assembling of the plant on the support structure based on the fifth virtual assembly of the plant, thus generating a sixth virtual assembly of the plant is performed, and it is determined if the sixth virtual assembly of the plant does now fit the second virtual assembly of the support structure, which does in fact not correspond to its initial design.

If the sixth virtual assembly of the plant does now fit the second virtual assembly of the support structure, all parts for the plant are shipped to the assembly location, where the plant is then built on the support structure. Otherwise the step of problem solution assessment is performed again, and the above loop of the workflow is followed again.

Although the invention is illustrated above, partly with reference to some preferred embodiments, it has to be understood that numerous modifications and combinations of different features of the embodiments can be made. Particularly, all described embodiments can be combined if not explicitly stated other wise. All of these modifications lie within the scope of the appended claims.

What is claimed is:

1. A method for virtual assembly of a structure, the structure being assembled from a multitude of components on a construction site, the components being provided at a multitude of locations remote from the construction site, the method comprising:
   measuring, at the multitude of locations remote from the construction site, the components subsequent to their production and prior to their transport to the construction site, wherein the measuring comprises determining at least the shape and size of interface parts of the components;
   creating, based on the measuring, virtual representations of the components;
   virtually assembling the representations of the components;
   determining whether predefined assembly tolerances would be violated if the structure would be assembled with the measured components;
   analyzing possible adjustment solutions from a set of adjustment solutions, the set of adjustment solutions comprising at least one of the following:
   one or more components are to be exchanged,
   one or more components are to be reworked, and
   the structure is to be redesigned; and
   performing or initializing actions according to at least one adjustment solution, the actions comprising at least one of:
   reproducing and/or exchanging one or more components,
   reworking one or more components, and
   redesigning the structure;
   in the event that predefined assembly tolerances would not be violated if the structure would be assembled with the measured components:
   transporting the components to the construction site, and/or
   assembling the components at the construction site.

2. The method according to claim 1, wherein:
   the virtually assembling the representations of the components is done with the help of CAD data of the structure and/or a digital terrain model of the construction site.

3. The method according to claim 1, wherein:
   the analyzing possible adjustment solutions depends on whether the structure can be assembled in accordance with predefined assembly tolerances with the measured components.

4. The method according to claim 1, wherein:
   for analyzing possible adjustment solutions an optimization algorithm is adapted to take into account a time schedule, the delay and costs created by a redesign of the structure, and for at least one component the delay and costs created by reproducing or reworking the respective component.

5. The method according to claim 1, the method further comprising:
   acquiring standard components, and
   initializing manufacturing of special components.

6. The method according to claim 1, wherein the structure is an individual manufacture.

7. The method according to claim 1, wherein the structure is or comprises at least one of:
   a building,
   a plant,
   a bridge,
   a support structure,
   a ship, and
   large machinery.

8. One or more non-transitory computer-readable media storing one or more programs that are configured, when executed, to cause one or more processors to execute the method as recited in claim 1.

9. A system for virtual assembly of a structure, the structure being supposed to be assembled from a multitude of components on a construction site, the system comprising:
   a plurality of measuring stations located at a plurality of production sites remote from the construction site, each measuring station having at least one measuring means for measuring at least one component of the structure subsequent to its production and prior to its transport, wherein the measuring comprises determining at least the shape and size of interface parts of the components, and being adapted for generating measurement data of the at least one component,
   computing means for:
   receive the measurement data from the measuring stations,
   virtually assembling the components based on the measurement data,
   determining, based on the virtual assembly and on assembly tolerances, whether predefined assembly tolerances would be violated if the structure would be assembled with the measured components, and
   analyzing and outputting possible adjustment solutions from a set of adjustment solutions, the set of adjustment solutions comprising at least one of the following:
   one or more components are to be exchanged,
   one or more components are to be reworked, and
   the structure is to be redesigned; and performing or initializing actions according to at least one adjustment solution, the actions comprising at least one of:
reproducing and/or exchanging one or more components, reworking one or more components, and
redesigning the structure;
logistics means for at least one of:
acquiring standard components and/or initializing manufacturing of special components and
shipping the standard and/or special components to the construction site;
manufacturing means for assembling the components at the construction site; and
machine control means for controlling machine-assisted assembly of components at the construction site.

10. The system according to claim 9, wherein:
construction site measuring means for measuring the construction site and producing measuring data as a basis for a digital terrain model of the construction site, wherein the computing means are adapted for taking the digital terrain model into account for the virtual assembly.

11. The system according to claim 9, wherein the measuring means comprises at least one of:
coordinate measuring machines,
laser scanners,
range cameras,
laser trackers and
tachymeters.

12. A method for engineering, procurement and construction of a structure, for organizing assembling parts for a large device or a building at an assembly or construction location, comprising the steps of:
 i) designing the structure and generating CAD data and specifications for the parts to be assembled;
 ii) virtually assembling the structure from the parts based on the CAD data by means of a computer program and generating a first virtual assembly;
 iii) using logistic means, acquiring standard parts and initializing manufacturing of special parts;
 iv) shipping the parts, including the standard parts and the special parts, to the assembly or construction location; and
 v) assembling the parts; wherein:
 the additional steps of
 a) measuring the parts or at least interface sections of the parts, including standard parts and special parts, and generating measured data of the parts to be assembled, before the step iv) of shipping the parts to the assembly location;
 b.1) virtually assembling the structure from the parts based on the measured data of the parts and generating a second virtual assembly, or
 b.2) positioning the parts based on the measured data;
 c) comparing the second virtual assembly or the positioned parts of step b.2) with the first virtual assembly and determining from this comparison and a comparison of measured and CAD part data if any parts do not conform with the generated CAD data and specifications;
 d) continuing with step iv) if the parts do conform with the generated CAD data and specifications and initializing a correction or an exchange of parts which do not conform with the generated CAD data and specifications;
 e) measuring the corrected or exchanged parts or at least interface sections of them, and generating measured data of the corrected or exchanged parts;
 f.1) virtually assembling the structure from the parts based on the measured data of the parts, including the corrected or exchanged parts, and generating a third virtual assembly; or
 f.2) positioning the parts based on the measured data;
 g) comparing the third virtual assembly with the first virtual assembly or the positioned parts of step f.2) and determining from this comparison and a comparison of measured and CAD part data if any parts do not conform with the generated CAD data and specifications;
 h) continuing with step iv) if the parts do conform with the generated CAD data and specification, and initializing a correction or an exchange of parts which do not conform with the generated CAD data and specifications and then continuing with step e).

13. A method for engineering, procurement and construction of a plant on a support structure, comprising the steps of:
 i) designing the support structure and the plant, including parts to be assembled, and generating CAD data and specifications for the support structure, the plant and the parts to be assembled;
 ii) staking out support positions for the support structure;
 iii) virtually assembling the support structure and the plant from the parts based on the CAD data by means of a computer program and generating a first virtual assembly of the support structure and the plant;
 iv) using logistic means, acquiring standard parts and initializing manufacturing of special parts for the support structure and the plant;
 v) shipping the parts of the support structure, including the standard parts and the special parts, to the construction location;
 vi) assembling the parts of the support structure and building the support structure;
 vii) shipping the parts of the plant, including the standard parts and the special parts, to the construction location; and
 viii) assembling the parts of the plant and building the plant on the support structure; wherein:
 the additional steps of
 a) measuring the support structure and generating measured data and a second virtual assembly of the support structure based on the measured data of the support structure, before the step vii) of shipping the parts of the plant to the construction location;
 b) comparing the second virtual assembly of the support structure based on the measured data with the first virtual assembly based on the CAD data of the support structure and determining from this comparison if the second virtual assembly does conform with the first virtual assembly and the specifications for the support structure;
 c) measuring the parts or at least interface sections of the parts for the plant and generating measured plant data, before the step vii) of shipping the parts of the plant to the construction location;
 d) virtually assembling the plant on the support structure based on the measured plant data and based on the second virtual assembly of the support structure, thus generating a second virtual assembly of the plant, and determining if the second virtual assembly of the plant does fit the second virtual assembly of the support structure;
e) if at least one of
    e.1) the second virtual assembly of the support structure does not conform with the first virtual assembly and the specifications for the support structure, and
    e.2) the second virtual assembly of the plant does not fit the second virtual assembly of the support structure,
then
f) performing at least one of
    g.1) modifying or re-building the support structure so that the modified or re-built support structure fits the first virtual assembly of the plant, followed by steps h.1), i.1), j.1), k.1), and
    g.2) re-designing the plant and/or correcting or re-manufacturing parts for the plant which do not conform with the CAD data or the specifications and generating a third virtual assembly of the plant so that the third virtual assembly of the plant fits the second virtual assembly of the support structure, followed by steps h.2), i.2), j.2),
otherwise continuing with step vii);
h.1) measuring the modified or re-built support structure and generating measured data and a third virtual assembly of the support structure based on the measured data of the modified or re-built support structure;
i.1) comparing the third virtual assembly of the modified or re-built support structure based on the measured data with the first virtual assembly based on the CAD data of the support structure and determining from this comparison if the third virtual assembly does conform with the first virtual assembly and the specifications for the support structure;
j.1) virtually assembling the plant on the support structure based on the first virtual assembly of the plant, based on CAD data, and based on the third virtual assembly of the support structure, thus generating a fourth virtual assembly of the plant, and determining if the fourth virtual assembly of the plant does fit the third virtual assembly of the support structure;
k.1) continuing with step vii) if the fourth virtual assembly of the plant does fit the third virtual assembly of the support structure, and elsewise continuing with step e);
h.2) measuring and generating measured data for the re-designed plant and/or corrected or re-manufactured parts for the plant and generating a fifth virtual assembly of the plant based on the measured data and/or the re-designed plant;
i.2) virtually assembling the plant on the support structure based on the fifth virtual assembly of the plant, thus generating a sixth virtual assembly of the plant, and determining if the sixth virtual assembly of the plant does fit the second virtual assembly of the support structure;
j.2) continuing with step vii) if the sixth virtual assembly of the plant does fit the third virtual assembly of the support structure, and elsewise continuing with step e).

14. A system for engineering, procurement and construction of a structure, for organizing assembling parts for a large device or a building at an assembly or construction location, the system comprising
    measuring means;
    computing and calculating means for execution of computer programs, wherein the computing and calculating means are configured for
    designing the structure and generating CAD data and specifications for the parts to be assembled; and
    virtually assembling the structure from the parts based on the CAD data and generating a virtual assembly; wherein:
    the measuring means are configured for measuring the parts or at least interface sections of the parts, including standard parts and special parts, and generating measured data of the parts to be assembled; and
    the computing and calculating means are additionally configured for:
    positioning the parts based on the measured data; comparing virtual assemblies with one another and determining from this comparison and a comparison of the measured and CAD part data if any parts do not conform with the generated CAD data and specifications;
    analyzing possible adjustment solutions from a set of adjustment solutions, the set of adjustment solutions comprising at least one of the following:
    one or more components are to be exchanged,
    one or more components are to be reworked, and
    the structure is to be redesigned; and
    performing or initializing actions according to at least one adjustment solution, the actions comprising at least one of:
    reproducing and/or exchanging one or more components,
    reworking one or more components, and
    redesigning the structure;
    in the event that predefined assembly tolerances would not be violated if the structure would be assembled with the measured components:
    transporting the components to the construction site, and/or
    assembling the components at the construction site.

* * * * *